May 6, 1952.   R. D. JUNKINS   2,596,030
BOILER EFFICIENCY INSTRUMENT
Filed March 23, 1948   3 Sheets-Sheet 1

*INVENTOR.*
*Raymond D. Junkins*

May 6, 1952  R. D. JUNKINS  2,596,030
BOILER EFFICIENCY INSTRUMENT
Filed March 23, 1948  3 Sheets-Sheet 2

INVENTOR.
Raymond D. Junkins

May 6, 1952      R. D. JUNKINS      2,596,030
BOILER EFFICIENCY INSTRUMENT

Filed March 23, 1948      3 Sheets-Sheet 3

INVENTOR.
Raymond D. Junkins

Patented May 6, 1952

2,596,030

UNITED STATES PATENT OFFICE 2,596,030

BOILER EFFICIENCY INSTRUMENT

Raymond D. Junkins, Cleveland Heights, Ohio, assignor to Bailey Meter Company, a corporation of Delaware Application March 23, 1948, Serial No. 16,461

1 Claim. (Cl. 73—112)

My invention relates to the art of power plant instruments and is particularly directed to providing instruments for measuring and visually exhibiting variables in the operation of power producing or utilizing apparatus. The manifestation may be in terms of the value of variables or of some function of the variables; or may be a result of interrelation or comparison of two or more variables where such interrelation of variables results in the attainment of a desirable index as to the operating condition or efficiency of the power producing or utilizing apparatus.

My invention is particularly directed to providing an improved efficiency meter for use with vapor generators or boilers as they are often called.

One object of my invention is to provide an operating guide continually visually advising the operator as to the operating condition of the boiler and at the same time making a permanent record thereof.

A further object is to provide a measuring instrumentality continuously interrelating heat input to a boiler with heat output therefrom in terms of overall thermal efficiency of the unit.

Another object is to provide an efficiency meter for boilers burning solid fuel such as coal on a grate.

Other objects will become apparent from a study of the specification and drawings describing my invention and from the claim.

Figure 1:
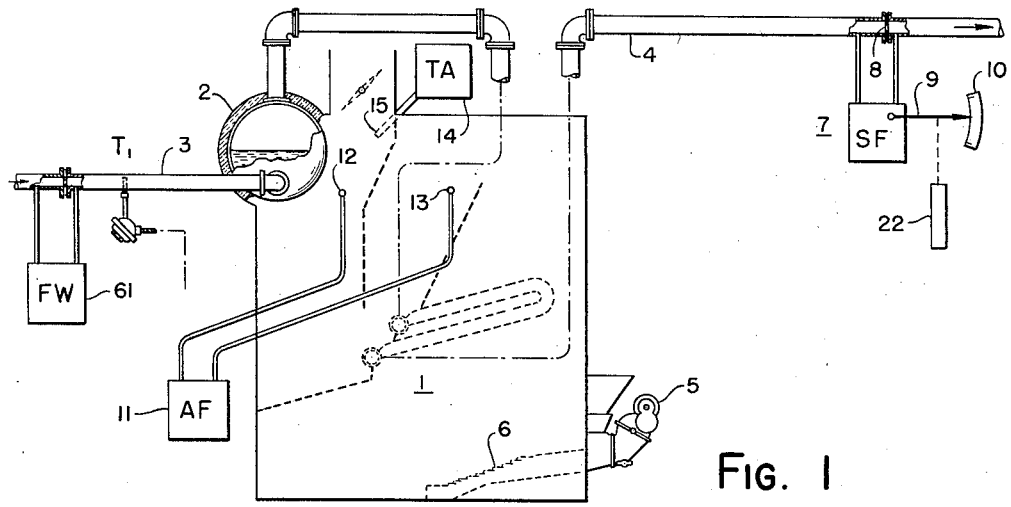
Fig. 1 is a diagrammatic representation of a vapor generator to which my invention may be applied.

Referring now to Fig. 1 I show therein in somewhat diagrammatic fashion a vapor generator 1 having a separation drum 2 to which feed water is supplied through a conduit 3 and from which steam discharges through a main conduit 4 to any point of usage. In the present illustrative embodiment I have chosen to apply my invention to a vapor generator whose furnace utilizes the combustion of a solid fuel such as coal supplied through the agency of a stoker 5 and burned upon the grates 6.

To ascertain the B. t. u. output of the unit, it is necessary to determine the difference between the heat supplied to the boiler in the feed water and the heat contained in the steam produced.

In normal operation, the same weight rate of steam leaves the boiler as enters in the form of feed water, temporary discrepancies occurring at change in load averaging out and of minimum importance in effect upon an operating efficiency guide. Preferably I measure the steam flow by means of a rate meter 7 connected to the conduit 4 as a measure of total output and reading in terms of B. t. u. content of the steam discharged. A feed water rate meter 61 is connected to the conduit 3 and in conjunction with a determination of heat content per pound of the feed water, provides a continuous measurement of the rate of supply of heat to the working fluid in the feed water. I have found that I may use the temperature of the feed water as a measurable function of the heat content of the water. I thus provide in connection with the conduit 3 a temperature measuring element $T_1$.

Figure 5:
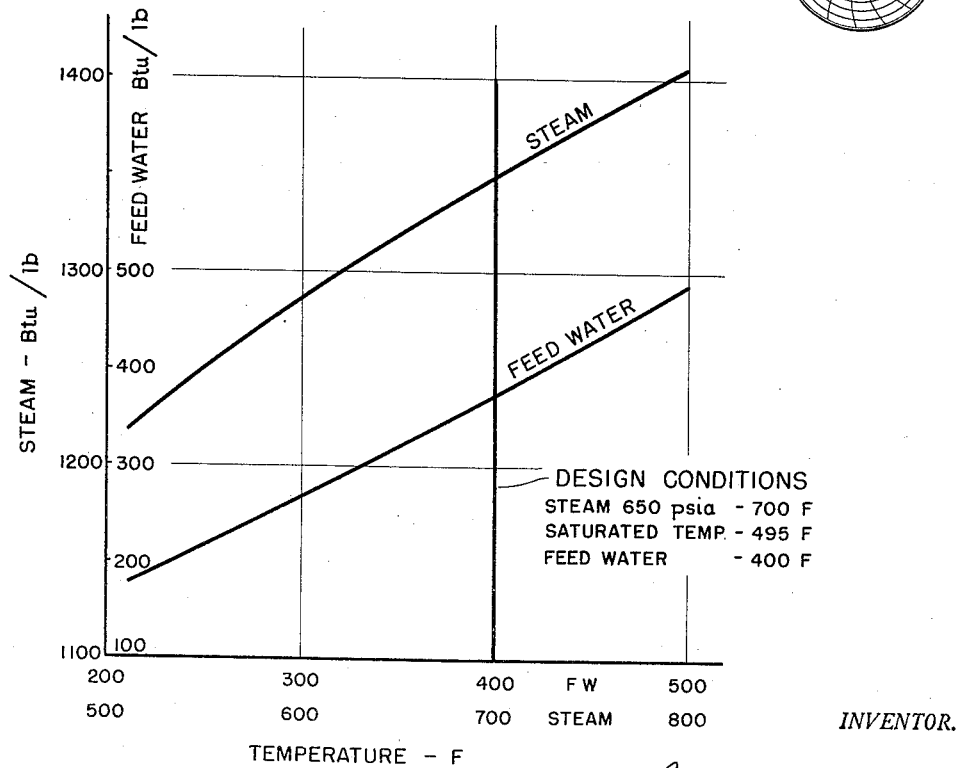

Reference should now be made to Fig. 5 wherein I have shown in graphic form the relation between temperature and heat content both for the feed water and for the steam under different conditions. As a premise I have chosen to consider that the power producing unit of Fig. 1 receives feed water at somewhat over 650 p. s. i. a. and at a temperature of 400 F., while the steam discharged through the conduit 4 is at a design condition of 650 p. s. i. a. and 700 F. with a saturation temperature of 495 F. From the steam tables it is seen that each pound of the feed water under these conditions has a heat value of 375 B. t. u. while each pound of steam under design conditions has a heat value of 1348 B. t. u. This is clearly shown in Fig. 5 and through the design conditions I have drawn a reference line vertically on the graph.

I furthermore assume that the pressure of the feed water supply and the pressure of the steam discharged remain substantially invariable although the effect of pressure variation upon heat content of either the water or the steam is substantially negligible. In fact a variation in steam pressure of ±100 p. s. i., at a constant temperature of 700 F., results in a heat content variation of less than ½% from the design condition value. I have therefore, in the present example, chosen to assume that the expected operating deviations in pressure of the feed water or of the steam from design value will be of a minor nature and will not introduce any significant error into the calculation or the resulting answer provided as an operating guide.

An examination of the graphs on Fig. 5 will show that the plot of feed water is slightly concave downward while the plot of steam is slightly convex upward thus indicating a slight departure from true linearity in functional relation between temperature and heat content of each. At the same time it will be noted that for any reasonable expectancy of departure in one direction or the other from design conditions that the relations are to all intents and purposes substantially linear and that therefore I may usually disregard this non-linearity in functional relationship.

I have shown the steam flow meter 7 as a differential type of meter responsive to the pressure differential existing across an obstruction in the flow conduit such, for example, as an orifice, Venturi tube, flow nozzle or the like, in this instance designated as the orifice 8. The pressure differential is the result of a temporary change in velocity of the flowing fluid and is in large degree restored further along the flow path; the permanent static pressure loss being chargeable as a cost of metering.

The meter may take the form of a mercury manometer or U-tube having its legs connected to the flow path at opposite sides of the orifice. A float or shaped bell is positioned with the mercury in one leg of the U-tube and its position is utilized to visually indicate either the pressure difference or the rate of fluid flow, usually upon a scale and/or upon a recording chart.

Such a differential pressure responsive rate-of-flow meter may indicate in terms of differential pressure ($h$=head) usually expressed as inches of water, or in terms of volume rate $Q$ expressed in cubic feet per hour, or in terms of weight rate $W$ expressed in pounds per hour. The differential pressure to which the float or bell is responsive is a measure of kinetic or velocity head, and $Q=CVA$ where $C$ includes all constants, $V$ represents velocity in feet per second through the fixed orifice area $A$, and $Q$ is in terms of volume (cubic feet per second).

The chart of a float actuated meter will be uniformly graduated to read in terms of $h$ but non-uniformly graduated to read in terms of $Q$ or $W$. For a meter employing a shaped bell of the type disclosed in the patent to Ledoux 1,064,748 a uniformly graduated chart may be used to read $Q$ or $W$. This is true because $Q \propto \sqrt{h}$ and $W \propto \sqrt{h}$. While my invention may well utilize other types of meters I preferably use the Ledoux bell type because the linear relation lends itself to more accurate visual readings and interrelating with other measurements or instruments.

Density $d$ of the flowing fluid plays an important part in the measurement of volume rate $Q$ or of weight rate $W$ of a flowing fluid by differential pressure responsive means. To have correct readings on either a volume or weight basis, the density of the fluid must be that for which the orifice is designed, or a correction factor must be applied. Inasmuch as the density of steam will vary from design value upon departure of temperature $T$ or pressure $P$ of the steam from design values, it follows that the rate-of-flow meter 7 will read incorrectly upon either a volume-rate or weight-rate basis if the actual temperature and/or pressure of the steam is other than 650 p. s. i. a. and 700 F.

The flow equation, or relation between differential head and weight rate is:

$$W = cM\sqrt{2ghd}$$

where $W$=weight rate of flow in lb. per sec.
$c$=coefficient of discharge
$M$=meter constant
$g$=acceleration of gravity
$h$=differential head in inches of a standard liquid such as water
$d$=density of fluid being measured, in lb. per cu. ft.

and $W$ (lb. per hr.) $= Q$ (cu. ft. per hr.) $\times d$ (lb. per cu. ft.) so that the orifice is designed to produce a certain differential pressure $h$ when there exists a certain flow rate through the orifice in either cu. ft. per hr. or in lb. per hr. at a predetermined density $d$.

Thus the scale 10 may be graduated to read either $h$ in inches water differential
$W$ in lb. per hr.

or $Q$ in cu. ft. per hr.

assuming $d$ remains at design value, and the only difference between a float meter and a Ledoux bell meter is that in the former, $Q$ or $W$ will be indicated on a non-linear scale, while with the latter, $Q$ or $W$ will be indicated on a linear scale.

The heat content of steam is usually expressed in B. t. u. per lb. Thus the rate-of-flow meter should preferably read on a weight basis and the chart be graduated in terms of lb. per hr. Due to the quadratic relation between differential pressure (to which the meter responds) and weight rate of flow (which is desirably to be indicated) a float type meter will have a non-uniformly graduated scale while a meter having a bell shaped in accordance with the Ledoux patent will have a uniformly graduated chart.

Assuming, then, that the steam flow meter 7 has an arm 9 whose movements are in linear relation to weight rate of fluid flow through the orifice 8, relative to a scale 10, then the design of the orifice and of the meter will be such that the meter will have a maximum capacity of $W$ lb. of steam per hr. at temperature $T$ and pressure $P$ conditions with an equivalent density $d$.

Now, if $W$ remains constant, i. e. the lb. per hr. of steam does not change, but the density $d$ increases, a smaller volume rate $Q$ will flow (because $W = Qd$) and inasmuch as $$h \propto \frac{1}{d}$$

the $h$ will be lower ($Q \propto \sqrt{h}$) so that the indicator 9 will read incorrectly lower on the scale 10. To have the indicator read correctly on the scale, a correction factor must be applied to the actual pen reading.

$$CF = \sqrt{\frac{d - \text{design}}{d - \text{actual}}}$$

As $d$ will vary with T and/or P then the correction factor CF must take into account the actual T and P in relation to the design T and P.

Assuming, as previously, that the meter 7 is designed on the basis of superheated steam at a pressure of 650 p. s. i. a. and a total temperature of 700 F., but that the actual operating pressure is 640 p. s. i. a. and the actual total temperature is 750 F., I have found that the correction factor by which the meter reading must be multiplied is .964 to read correctly the weight rate of flow.

Frequently the pressure will remain substantially invariable but the total temperature will vary. In this example assume the pressure remains at 650 p. s. i. a.

| Total Temp., F. | Meter Correction Factor $C_t$ |
|---|---|
| 600 | 1.067 |
| 650 | 1.030 |
| 700 | 1.000 |
| 750 | .974 |
| 800 | .950 |
| 850 | .928 |
| 900 | .910 | or the temperature may remain at 700 F. and the pressure vary

| Pressure, p. s. i. a. | Meter Correction Factor $C_p$ |
|---|---|
| 630 | 0.983 |
| 640 | .990 |
| 650 | 1.000 |
| 660 | 1.008 |
| 670 | 1.016 |

From this it will be seen that $CF = C_p \times C_t$
$= .990 \times .974 = .964$ From the steam tables I find that for a constant pressure of 650 p. s. i. a.

| Total Temp., F. | Total Heat B. t. u. per lb. |
|---|---|
| 600 | 1,285.3 |
| 650 | 1,317.7 |
| 700 | 1,348.0 |
| 750 | 1,377.1 |
| 800 | 1,405.4 |
| 850 | 1,433.3 |
| 900 | 1,460.8 | or at a constant total temperature of 700 F.

| Pressure, p. s. i. a. | B. t. u. per lb. |
|---|---|
| 630 | 1,349.2 |
| 640 | 1,348.6 |
| 650 | 1,348.0 |
| 660 | 1,347.4 |
| 670 | 1,346.8 |

From which it will be seen that under design conditions of 650 p. s. i. a. and 700 F. the total heat in each lb. of steam is 1348 B. t. u., so that if T and P (and consequently $d$) are unvarying I may graduate the scale 10 in terms of both (lb. per hr.) and (B. t. u. per hr.), thus:

| Lb. per hr. | B. t. u. per hr. |
|---|---|
| 100,000 | 134,800,000 |
| 10,000 | 13,480,000 |
| 1,000 | 1,348,000 |
| 0 | 0 |

If the arm 9 reads 1 lb. per hr. of steam (on the scale 10) it also reads 1348 B. t. u. Now if the temperature and/or the pressure varies from design conditions of 650 p. s. i. a. and 700 F. then the arm 9 will read incorrectly on a weight rate basis as previously pointed out. Ordinarily one would be inclined to correct the weight rate reading by way of a correction factor CF as previously discussed. To obtain the total heat rate one would then multiply the corrected weight rate by the steam table value of total heat in B. t. u. per lb. of the steam at actual conditions of temperature and pressure. I have found however that the correction for weight rate and the correction for B. t. u. content are self-compensating within commercial accuracy limits and therefore that the reading of a rate flow meter, uncorrected for deviations in P and T from design values, is substantially correct on a B. t. u. basis.

Considering the example given, assume that the temperature has risen to 750 F. while the pressure has fallen to 640 p. s. i. a., it will be noted that the indicator 9 will read $$1.027 \left(\frac{1}{CF}\right)$$

high on the scale 10 in terms of lb. per hr. and normally a correction factor of .974 would be applied to the pointer reading because there is still the same pound of steam passing the orifice, although at a different density and thus a different volume rate.

If the pointer reading is high by 1.027 on a weight basis it is also high by that percentage as compared to 1348 B. t. u. per lb. in which the scale 10 is also graduated and reads 1384.4 B. t. u. I find, however, from the steam tables that a pound of steam at 640 p. s. i. a. and 750 F. has a heat content of 1377.6 B. t. u. Thus each pound of steam under the actual T and P conditions has a total heat content of 1377.6 B. t. u. whereas the pointer (uncorrected in any way) reads 1384.4 B. t. u. The discrepancy is $$1384.4 - 1377.6 = 6.8 \text{ B. t. u.}$$

high or in error by $6.8/1377.6 = .49\%$ high on a B. t. u. basis. Inasmuch as ½ of 1 percent error is well within commercial accuracies it is clear that the rate meter 7, uncorrected for variations in T or P, may be read directly in total heat rate passing through the conduit 4 and that it is unnecessary to take any temperature or pressure measurements of the steam.

To show that this situation persists over a considerable deviation in T and P from design values:

*Meter designed for 650 p. s. i. a. and 700 F.*

[Assume pressure remains constant @ 650 p. s. i. a.]

| Total Temp. F. | Correction Factor CF | Pointer Reads Hi or Lo 1/CF (1) | B. t. u. per Lb. @ 650 p. s. i. a. 700 F (2) | Pointer Reads B. t. u. (1)×(2) | B. t. u. per Lb. @ from Steam Tables | Pointer Deviation Hi or Lo B. t. u. | B. t. u. Pointer Error Per Cent |
|---|---|---|---|---|---|---|---|
| 600 | 1.067 | −.937 | 1,348 | 1,264.1 | 1,285.3 | −21.2 | −1.65 |
| 650 | 1.030 | −.971 | 1,348 | 1,309.5 | 1,317.7 | −8.7 | −.66 |
| 700 | 1.000 | 1.000 | 1,348 | 1,348.0 | 1,348.0 | 0 | 0 |
| 750 | .974 | +1.027 | 1,348 | 1,384.4 | 1,377.1 | +7.3 | +.53 |
| 800 | .950 | +1.053 | 1,348 | 1,419.4 | 1,405.4 | +14.0 | +.99 |
| 850 | .928 | +1.079 | 1,348 | 1,454.5 | 1,433.3 | +21.2 | +1.48 |
| 900 | .910 | +1.099 | 1,348 | 1,481.5 | 1,460.8 | +20.7 | +1.41 |

[Assume total temp. remains constant @ 700 F.]

| Press. P. s. i. a. | Correction Factor CF | Pointer Reads Hi or Lo 1/CF (1) | B. t. u. per Lb. @ 650 p. s. i. a. 700 F (2) | Pointer Reads B. t. u. (1)×(2) | B. t. u. per Lb. @ from Steam Tables | Pointer Deviation Hi or Lo B. t. u. | B. t. u. Pointer Error Per Cent |
|---|---|---|---|---|---|---|---|
| 630 | .983 | +1.017 | 1,348 | 1,370.9 | 1,349.2 | +21.7 | +1.61 |
| 640 | .990 | +1.010 | 1,348 | 1,361.5 | 1,348.6 | +12.9 | +.96 |
| 650 | 1.000 | 1.000 | 1,348 | 1,348.0 | 1,348.0 | 0 | 0 |
| 660 | 1.008 | −.992 | 1,348 | 1,337.2 | 1,347.4 | −10.2 | −.76 |
| 670 | 1.016 | −.984 | 1,348 | 1,326.4 | 1,346.8 | −20.4 | −1.51 |

From the above it will be evident that the meter 7 provides a continuous determination of the total heat in B. t. u. in the steam discharged through the conduit 4. To obtain a measurement of the rate of heat output of the boiler I subtract from the heat in the steam the heat in the feed water admitted to the boiler through the conduit 3 and thus obtain a measure of the heat which has been added to each lb. of the working fluid in its passage through the boiler and furthermore a determination of the rate of heat absorbed, i. e. the heat output of the unit.

To ascertain the rate of heat admitted in the feed water I utilize the weight rate of supply of feed water (meter 61) multiplied by the heat content per pound through the agency of the temperature measuring device T₁ and with reference to the corresponding graph in Fig. 5.

In the weight rate measurement of heated water an inaccuracy appears through change in density resulting from change in temperature but substantially no change is effected through change in pressure. Likewise, changes in temperature result in considerable changes in heat content, while changes in pressure result in negligible changes in heat content.

*Heated water—Variations in density and heat content*

| Temp. F. | Weight Rate Flow Meter Correction Factor | B. t. u. per lb. from Tables |
|---|---|---|
| 300 | 1.035 | 269.48 |
| 350 | 1.019 | 321.55 |
| 400 | 1.000 | 374.96 |
| 450 | .978 | 430.30 |
| 500 | .954 | 483.05 |

From the above it will be seen that the manifestations of feed water meter 61 may be utilized as rate measure of B. t. u. in the feed water if compensated by corrections for density and heat content per pound occurring upon departure in temperature of the feed water from design temperature. I provide, in conjunction with the meter 61 a temperature sensitive device T₁ acting through a cam 35 for continually multiplying the actual meter 61 manifestation by values combining density and heat content corrections for different temperatures.

Desirably I compare the heat output of the boiler with the heat input to the boiler to obtain a measure of overall efficiency. I have briefly mentioned certain considerations in connection with a continuous determination of the heat output of the boiler. Physical difficulties often exist in the continuous determination of heat input to the boiler when the fuel supplied for combustion is solid fuel, such as coal for example, being fed to a stoker. The coal itself will vary as to size, moisture content, chemical composition and heat value and the feed to the grate may be discontinuous in nature. Even after the coal is supplied to the grate the rate of combustion of the coal may vary from minute to minute depending upon many operating conditions. For such a fuel it is therefore often difficult to provide a continuous manifestation of rate of supply of B. t. u. or rather of liberation of B. t. u. from which the steam is to be produced.

Figure 2:
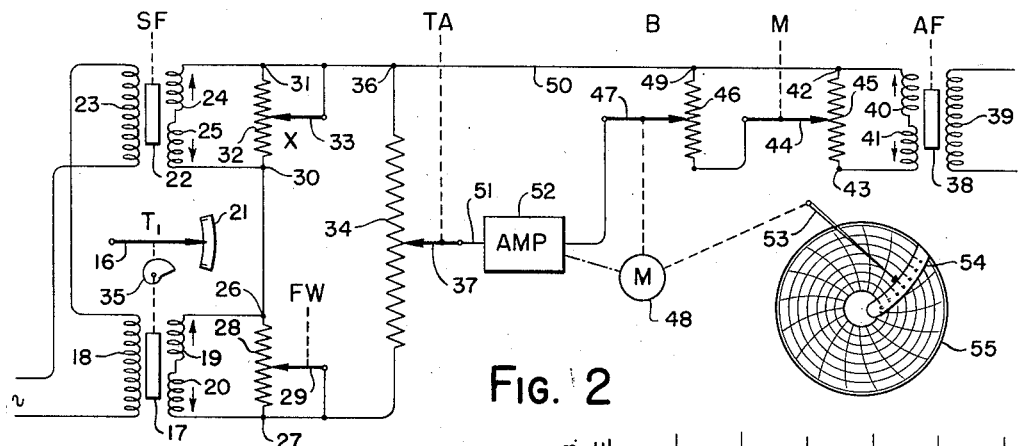
Fig. 2 is a schematic showing of an electric calculating network illustrating a preferred embodiment of my invention.

In accordance with the present embodiment of my invention as illustrated in Figs. 1 and 2 it is not necessary to actually measure the rate of supply of coal to the grates or the rate of liberation of heat from the coal within the furnace. I provide means for inferentially continuously obtaining this information within reasonable limits of accuracy useful as a continuous operating guide.

Figure 6:
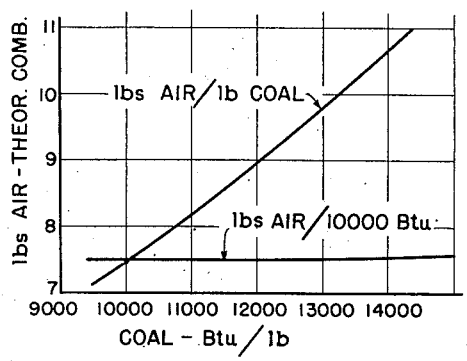
Figs. 5 and 6 are graphs of conditions pertinent to the operation of vapor generators.

This portion of my invention is predicated upon an appreciation of the fact that air is a fuel just as much as coal. Reference to Fig. 6 reveals that a linear relation exists between the heating value of coals in B. t. u. per lb. and the pounds of air required for theoretical combustion of the coal. This relation holds true throughout the range of commercial coal. Fig. 6 also clearly illustrates that a substantially constant value of 7.5 lb. of air is required for the release of each 10,000 B. t. u. under theoretical combustion conditions regardless of the type or nature of the coal being burned. Thus, to ascertain the rate of heat input to the burner 1 in terms of B. t. u. per hr. under theoretical combustion conditions, it is only necessary to obtain a measure of air flow through the unit in pounds per hour and to multiply this by the B. t. u. release per lb. of air divided by the percent total air actually existing through the unit in terms of percentage of theoretical air required for perfect combustion. This operation may be expressed as follows:

$$\text{Heat input in B. t. u./hr. under theoretical combustion conditions} = \text{flow (lb./hr.)} \times \frac{\text{measured air}}{\text{lb. air per 10,000 B. t. u.}} \cdot \frac{10,000}{1}$$

$$= AF \times 1333$$

while $$\text{Under actual conditions B. t. u./hr.} = 1333 \cdot AF \times \frac{1}{\left(\text{Ratio of } \frac{\text{actual air}}{\text{theor. air}}\right)}$$

$$= \frac{1333 \cdot AF}{\text{Per cent total air}}$$

If conditions of theoretical combustion obtain then percent total air would be 1.00. From the above the heat release under such theoretical combustion conditions will be 1333×measured air flow in lb. per hr. with the result expressed in B. t. u. per hr. If twice as much air is being supplied with the fuel for combustion as is theoretically required, then the (percent total air) =2.00 and under such actual combustion conditions the total heat input in B. t. u. per hr. will equal 1333×the measured pounds of air passing through the unit per hour divided by 2. Thus it will be seen that I may obtain a continuous representation of the B. t. u. per hr. heat input or heat release within the furnace by ascertaining a measurement of the weight rate of air flow through the unit and simultaneously a measurement of the percent total air in comparison with the theoretical air required.

To obtain a measure of the air flow passing through the unit in pounds per hour I provide a rate flow meter 11 designated (AF) and sensitive to pressure differentials existing between the pressure connections 12, 13 in the path of the products of combustion passing through the unit. The connections 12, 13 are responsive to the pressure differentials existing between two passes of the boiler or may be located across an air heater or other fixed restriction in the path of the excess air and products of combustion flowing through the unit. It is only important that the meter 11 provide a continuous measure of total air passing through the unit in pounds per hour and such meters are well known in the art. By "air flow" I intend to include the rate of flow of gaseous products of combustion and excess air passing through the generating unit i. e. the assembly of vapor generator, superheaters, air heaters, etc. As is well known to those familiar with the art air flow has long been utilized as an indication of firing rate or of heat liberation and thereby an indication of heat available for vaporizing the liquid and superheating the vapor. On the other hand the rate of flow of steam produced is a measure of heat absorption.

To obtain a continuous representation of total air TA in terms of ratio of actual air flow to theoretical air flow I provide the (TA) meter 14 diagrammatically shown as having a sample tube 15 located near the point of discharge of air flow from the boiler 1. Such a meter is preferably of a type continuously analyzing the gases to ascertain the percentage therein of free oxygen and/or of unburned combustibles and providing an indication in terms of excess air over that theoretically required for perfect combustion or preferably in percent total air which is the ratio between the actual air and the theoretical air required for perfect combustion. Inasmuch as such measuring instrumentalities are well known it appears unnecessary to go into detail of construction or operation of the instrument per se.

I will now refer particularly to Fig. 2 wherein I have schematically illustrated the calculating network for obtaining continuously an answer of B. t. u. output divided by B. t. u. input to the unit in terms of overall boiler efficiency. It will be understood that the designations applied to Fig. 2 of $T_1$, FW, SF, AF and TA apply respectively to the continuous measurement of temperature of the feed water, rate of feed water flow, steam outflow in terms of B. t. u., rate of air flow, and percent total air, respectively of Fig. 1. These are the variables which, as previously pointed out, I desire to incorporate in my calculating network to arrive at an answer useful in guiding the operation of the unit.

The feed water temperature measuring element $T_1$ is arranged to position an arm 16 which in turn vertically positions a movable core piece 17 relative to a continuously energized primary winding 18 and to a pair of bucking secondary windings 19, 20 connected in series. The arm 16 may indicate relative to an index 21 the actual value of feed water temperature.

In similar fashion the steam meter SF is arranged to vertically position a movable core member 22 of an adjustable transformer having a continuously energized primary winding 23 and a pair of bucking secondary windings 24, 25 connected in series.

Across the terminals 26, 27 of the secondary windings 19, 20 is a resistance 28 contacted by a feed water positioned contact arm 29 thus providing selectivity as to that portion of the resistance 28 which is to be included between the terminals 26, 27. In similar manner a manually adjustable contact arm 33 engages a resistance 32 and selects that portion of the latter which is desirably to be in circuit between terminals 30, 31 across the secondary windings 24, 25. The terminals 26, 30 are connected by a conductor while the terminals 27, 31 are bridged by a resistance 34. I designate as X that portion of the resistance 32 effectively in circuit between the terminals 30, 31 and designate as FW that portion of the resistance 28 effectively in circuit between the terminals 26, 27.

The various electrical elements mentioned comprise a subtraction circuit whereby a voltage across the terminals 27, 31 is representative of B. t. u. output or B. t. u. absorbed. The voltage across the terminals 30, 31 is representative of the rate of B. t. u. content of the steam discharged and with the manually adjustable contact 33 allows for calibration as well as incorporation of constants as required.

The voltage across the terminals 26, 27 is initially representative of heat content per pound of feed water. Were it not for the cam 35, the arm 16 would so position the core 17 as to provide a voltage 26, 27 representative of feed water temperature, but the cam 35 incorporates both the density correction and B. t. u. content correction previously mentioned for changes in feed water temperature. Thus, while the arm 16 correctly indicates feed water temperature upon the index 21, the voltage primarily across the terminals 26, 27 is continuously representative of B. t. u. per pound of feed water. This voltage is modified by the positioning of contact arm 29 along the resistance 28 so that the actual voltage between the terminals 26, 27 is representative of B. t. u. per hr. supplied to the boiler in the feed water.

The resulting voltage between the terminals 27, 31 is therefore representative of heat adsorbed or heat output of the boiler in terms of B. t. u. per hr.

$$\text{Heat output} = (SF \cdot X) - (\phi(T_1) \cdot FW)$$

I show the terminals 27, 31 spanned by a resistance 34 which is contacted by a movable contact arm 37 positioned by the TA meter 14. Thus the voltage drop across 36, 37 represents $$[(SF \cdot X) - (\phi(T_1) \cdot FW)] \cdot TA$$

At the right of the network of Fig. 2 the designation AF is used to show that the air flow meter 11 is arranged to vertically position a core member 38 relative to a continuously energized primary winding 39 and to a pair of bucking secondary windings 40, 41 connected in series. The voltage drop across the secondaries 40, 41 varies directly with the positioning of the core member 38 and consequently is proportional to changes in measured rate of air flow passing through the unit. Across the terminals 42, 43 of the secondary windings 40, 41 I show a resistance 45 contacted by a maunally adjustable contact arm 44 whose position is designated by (M) and so placed as to represent the numerical value 1333 which, in the present example, is representative of B. t. u. per lb. of air needed for theoretical combustion conditions. The portion of the voltage drop across the terminals 42, 43 which is selected by the contact 44 represents B. t. u. per lb. of air and the value of the voltage drop in the resistance 45 between the terminal 42 and the contact 44 is therefore representative of the product of air flow in lb. per hr. and B. t. u. per lb. required for theoretical combustion of the solid fuel being burned in the furnace.

Voltage drop 42—44 represents $AF \cdot 1333$ when
AF is in terms of lb. per hr.
1333 is theoretical B. t. u. liberated per lb. air
and
42—44 is in terms of B. t. u. per hr.
therefore
B. t. u. input if theoretically perfect combustion prevails $= 1333\ AF$
$\qquad\quad = $ voltage drop 42—44

Spanning that portion of the resisatnce 45 between the terminal 42 and the contact 44 is a resistance 46 contacted by a movable contact arm 47 which is positioned through the agency of a reversible motor 48 for rebalancing the circuit. The position of the contact arm 47 is designated B.

Voltage drop 47—49 represents $B \times M \times AF$ or $B \cdot 1333 \cdot AF$

The terminals 36, 49 are joined by a conductor 50. Joining the contact arms 37 and 47 is a conductor 51 in which is interposed an amplifier and motor control circuit 52. The latter is sensitive to any unbalance of voltage in the conductor 51 and is adapted to cause an energization of the motor 48 in one direction or the other and at a controllable speed dependent upon the phase or magnitude of the voltage unbalance in the conductor 51. Such amplifier and motor control circuit 52 and motor 48 may be of the type disclosed and claimed in the copending application of Anthony J. Hornfeck, Serial No. 693,290, filed August 27, 1946, now Patent No. 2,544,790, granted March 13, 1951.

The network just described is arranged to perform a calculation which may be expressed by:

$$[(SF \cdot X) - (\phi(T_1) \cdot FW)] \cdot TA = B \cdot M \cdot AF$$

$$B = \frac{[(SF \cdot X) - (\phi(T_1) \cdot FW)] \cdot TA}{1333 AF}$$

But $$[(SF \cdot X) - (\phi(T_1) \cdot FW)] = \text{Heat input in B. t. u./hr.}$$

and $$\frac{1333 AF}{TA} = \text{Heat input in B. t. u./hr.}$$

$$\text{Boiler Efficiency} = \frac{\text{Heat output}}{\text{Heat input}}$$

$$= \frac{[(SF \cdot X) - (\phi(T_1) \cdot FW)]}{\frac{1333 AF}{TA}} = B$$

therefore $$B = \frac{\text{Heat output in B. t. u./hr.}}{\text{Heat input in B. t. u./hr.}}$$

$$= \text{Per cent boiler efficiency}$$

When the network is in balance no voltage drop exists in the conductor 51 and the motor 48 is quiescent. The network embodies factors representative of those variable useful in interrelating heat input and heat output to arrive at the overall thermal efficiency of the boiler in percentage or in other desirable units. If the network is unbalanced by variation in $T_1$, FW, SF, TA, or AF then the motor 48 is caused to rotate in proper direction to position the arm 47 until the value B balances the changed condition and the system is again in balance. Inasmuch as the arm 47 is positioned in accordance with changes in boiler efficiency it will be apparent that positioning of the indicator arm 53 also by the motor 48 is likewise moved with changes in boiler efficiency and is positioned relative to the index 54 and the chart 55 to provide a continuous visual manifestation of boiler efficiency in percentage through continuously solving the mathematical operation of dividing heat output value by heat input value.

Figure 3:
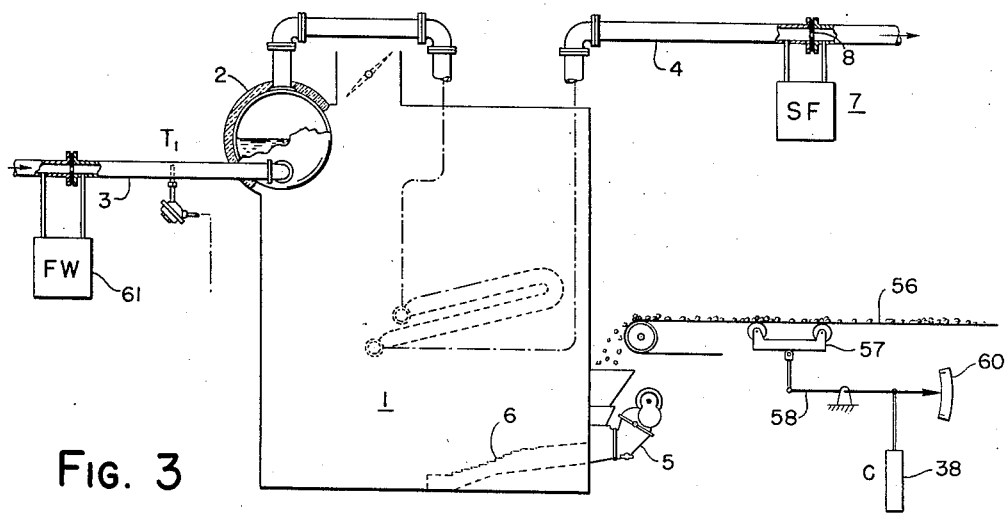
Fig. 3 is a schematic diagram embodying a second form of my invention as applied to a vapor generator.

Referring now to Fig. 3 I show therein a second embodiment of my invention providing in diagrammatic form a steam boiler similar to that shown in Fig. 1 except that I have additionally shown means for feeding coal to the stoker 5 and for continuously determining the rate of feed of fuel. In connection with Fig. 4 this constitutes a somewhat different arrangement of my invention than I have described in connection with Figs. 1 and 2.

In Fig. 3 I diagrammatically indicate at 56 a belt conveyor for delivering coal to the stoker 5. Power means for driving the belt conveyer and speed control means for the power means are not shown. The belt conveyor 56 passes over a weighing scale device 57 of known type wherein the moving belt and coal carried thereon are continuously weighed through the agency of pivoted members 58 indicating on an index 60 the weight rate of coal fed to the stoker 5. At the same time the member 58 positions the core 38 of the transformer designated C in Fig. 4 representing the rate of coal feed.

Figure 4:
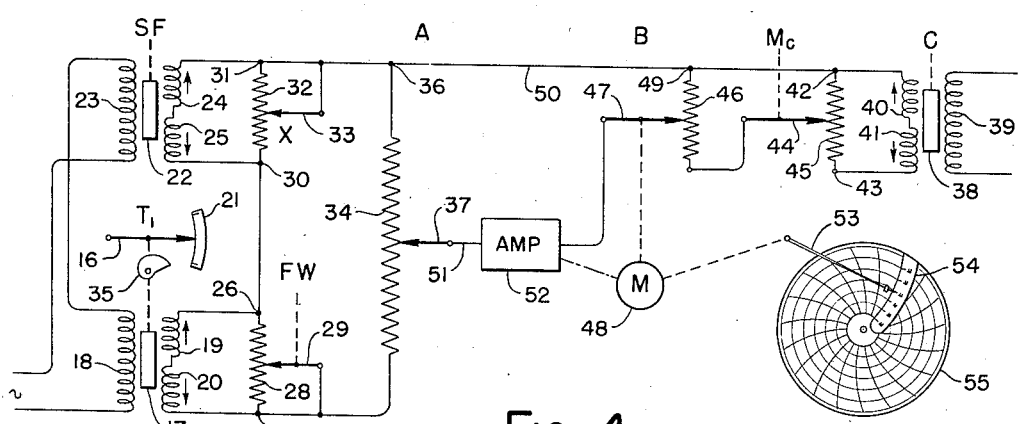
Fig. 4 is a schematic showing of an electric calculating network in connection with the boiler of Fig. 3.

Referring now to the calculating network of Fig. 4 it will be seen that the designations SF, $T_1$, FW, B, $M_c$ and C represent respectively, steam flow output rate in terms of B. t. u., temperature of incoming feed water, weight rate of feed water supply, the balancing position in terms of boiler efficiency, a manual adjustment representative of B. t. u. value of the coal, and the weight rate of supply of coal, respectively. Designation $M_c$ is manually positioned to values representative of the calorific value of coal which is manually sampled and analyzed in a laboratory. Inasmuch as the calorific value of such coal does not vary from minute to minute or usually from hour to hour it is satisfactory to take periodic samples and manually adjust the value $M_c$ when necessary.

The difference between the total heat in the steam and the total heat in the feed water gives a continuous indication of heat output of the boiler. On the other hand the rate of heat input is determined by multiplying the coal feed rate C by the calorific value of each lb. of coal $M_c$. The various elements are incorporated in the calculating network similarly to the showing of Fig. 2 although in this instance the contact arm 37 is a manual adjustment for calibrating purposes. I herein designate its position as A. The performance of the network is as follows:

$$[(SF \cdot X) - (\phi(T_1) \cdot FW)] \cdot A = B \cdot M_c \cdot C$$

where $SF$ = Total heat in steam in B. t. u. per hr.
$T_1$ = Temperature of feed water
$\phi(T_1)$ = Heat in feed water in B. t. u. per lb.
$FW$ = Rate of feed water in lb. per hr.
$X$ = Calibrating adjustment
$A$ = Calibrating adjustment
$M_c$ = Calorific value of coal
$C$ = Weight rate of coal in lb. per hr.
$B$ = Balance position then $$B = \frac{[(SF \cdot X) - (\phi(T_1) \cdot FW)] \cdot A}{M_c \cdot C}$$

$$= \frac{\text{Heat output in B. t. u. per hr.}}{\text{Heat input in B. t. u. per hr.}}$$

= Per cent boiler efficiency

Figure 7:
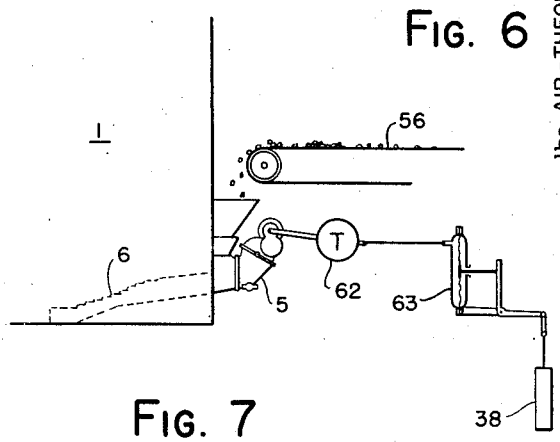
Fig. 7 illustrates a modification of Fig. 3.

In Fig. 7 I show a portion of Fig. 3 to illustrate a modification wherein the actual speed of the stoker 5 is utilized in providing a continuous measure of rate of feed of coal to the grate 6. While the arrangement of Fig. 3 provides a continuous weight rate measure of coal fed to the stoker hopper 5 there is of course a certain time lag between the placing of the coal in the hopper and the burning of the same upon the grate. Under relatively uniform boiler operation this lag would be of negligible importance but if the load is swinging widely the arrangement of Fig. 7 eliminates a considerable portion of the time factor and provides at C a measurement more nearly in consonance with the actual heat liberation upon the grate.

At 62 I show a tachometer driven by and with the stoker 5 creating a fluid pressure representative of rate of supply of coal to the grate 6 or in terms of heat liberation upon the grates. This fluid pressure is applied to a pressure responsive device 63 for positioning the core member 38 previously mentioned.

Figure 8:
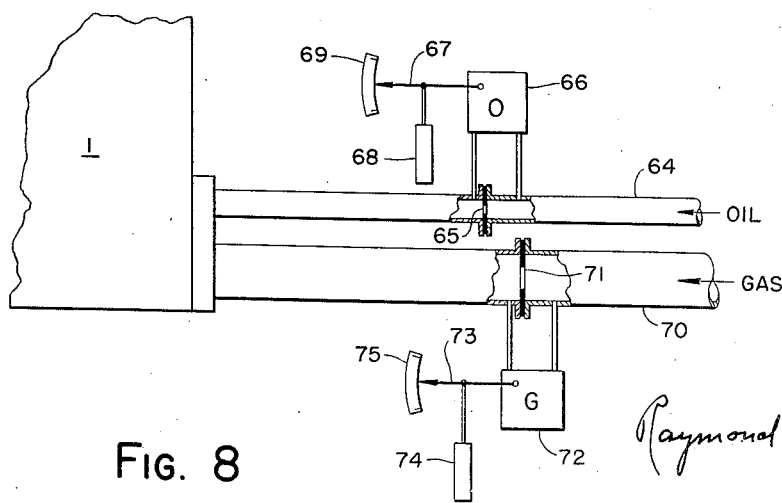
Fig. 8 shows a portion of a vapor generator fired by two dissimilar fluid fuels.
Figure 9:
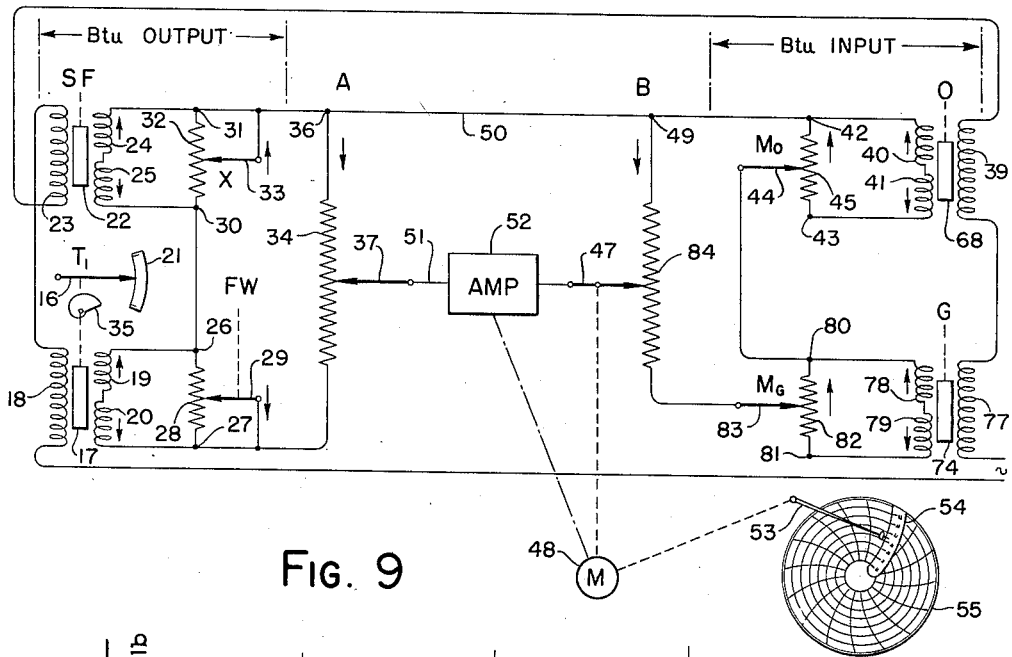
Fig. 9 is a wiring diagram in connection with Fig. 8.

In Figs. 8 and 9 I show a further embodiment adapted to a furnace utilizing two fuels which may vary in supply rate and B. t. u. content for combustion. In Fig. 8 the furnace I is supplied with oil through a conduit 64 having located therein an orifice 65 across which is connected a rate of flow meter 66. The flow meter 66 is adapted to position an arm 67 representative of rate of flow of the oil fuel to the furnace and cooperates with an index 69 which may be graduated in terms of weight rate or otherwise as desired. The arm 67 additionally positions the core 68 for the network of Fig. 9.

Gas is supplied to the furnace I as a fuel through the conduit 70 in which is located an orifice 71 across which is connected a flow meter 72 having a movable arm 73 positioned representative of rate of flow of gas to the furnace. The arm 73 is arranged to cooperate with an index 75 which may be graduated in rate of supply of gas or other units as desired. Simultaneously the arm 73 positions the core 74 of the network in Fig. 9.

In the arrangement of Fig. 9 I indicate at the left the elements determining heat output of the boiler, and at the right the elements determining heat input. The operation of the system performs as follows:

$$[(SF \cdot X) - (\phi(T_1) \cdot FW)] \cdot A = B \cdot [(O \cdot MO) + (G \cdot MG)]$$

Heat output $\cdot A = B \cdot$ Heat input $$B = \frac{[(SF \cdot X) - (\phi(T_1) \cdot FW)] \cdot A}{(O \cdot MO) + (G \cdot MG)}$$

$$= \frac{\text{Heat output}}{\text{Heat input}}$$

= Per cent boiler efficiency

For ascertaining the B. t. u. input I show the oil meter 66 arranged to position the core 68 relative to a continuously energized primary 39 and to a pair of bucking secondary windings 40, 41 connected in series. I designate the positioning of the element 68 by O and the rate of supply of oil through the conduit 64 is represented by the voltage drop between the terminals 42, 43 across which is connected a resistance 45.

In similar manner the gas flow meter 72 positions a core 74 relative to a continuously energized primary winding 77 and to a pair of bucking secondary windings 78, 79 connected in series. Across the terminals 80, 81 of the secondary windings is shown a resistance 82 so that the rate of supply of gas, designated as G is represented by the voltage drop between the terminals 80, 81.

An adjustable contact arm 44, connected to the terminal 80, is arranged to be manually positioned along the resistance 45 representative of the calorific value of the oil being burned and designated at Mo. Similarly the contact arm 83 is manually positionable along the resistance 82 representative of the calorific value of the gas being burned and designated as Mg. Contact arm 83 is connected to a terminal 49 of the conductor 50 through a resistance 84 which is contacted by the arm 47 under the control of motor 48.

The arrangement is such that the effective voltage drop MO across 42—42 is continually added to the voltage drop MG across 80—83 so that the voltage drop across 49—83=$(O \times Mo) + (G \times Mg)$ and therefore is representative of the total B. t. u. input per hour to the furnace. The network as a whole continuously divides heat output by heat input to ascertain overall boiler efficiency.

While I have chosen to illustrate and describe certain preferred embodiments of my invention, it is to be understood that this is by way of example only and not to be considered as limiting.

Certain subject matter, disclosed but not claimed herein, is disclosed and claimed in my divisional application SN 280,496, filed April 4, 1952.

What I claim as new and desire to secure by Letters Patent of the United States, is:

A boiler efficiency meter for exhibiting the over-all efficiency of a boiler including, a device solely responsive to the rate of flow of the steam produced over a range including the mathematically true response to the steam flow for a predetermined flow of steam temperature and pressure, a temperature measuring device for the feed water, a flow rate meter for the feed water, a first calculating network which responds to the feed water factors for continuously representing the heat level thereof, a second calculating network which responds to the first calculating network and the device responsive to the rate of flow of the steam for establishing an electrical value continuously representing the heat ouptut of the boiler, an air flow rate meter, a device determining the ratio of total air to theoretical air, and a third calculating network responding to the air flow rate meter and the ratio device for continuously representing the heat input to the boiler, and a fourth calculating network responsive to the input and output effects for continuously representing the heat efficiency of the boiler.

RAYMOND D. JUNKINS.

REFERENCES CITED

The following references are of record in the file of this patent:

UNITED STATES PATENTS

| Number | Name | Date |
|---|---|---|
| 2,143,820 | Payn | Jan. 10, 1939 |
| 2,252,367 | Germer | Aug. 12, 1941 |
| 2,293,403 | Razek | Aug. 18, 1942 |
| 2,341,407 | Xenis et al. | Feb. 8, 1944 |